US008785773B1

(12) United States Patent
Lanni (10) Patent No.: US 8,785,773 B1
(45) Date of Patent: Jul. 22, 2014

(54) PROGRAMMABLE ELECTRICAL OUTLET AND KEYED LOCK BOX FOR CONNECTION THEREWITH

(76) Inventor: David Lanni, North Providence, RI (US)

(*) Notice: Subject to any disclaimer, the term of this patent is extended or adjusted under 35 U.S.C. 154(b) by 57 days.

(21) Appl. No.: 13/562,594

(22) Filed: Jul. 31, 2012

(51) Int. Cl.
*H02G 3/14* (2006.01)
(52) U.S. Cl.
USPC .............................. 174/53; 307/116; 379/111
(58) Field of Classification Search
USPC .............. 174/53; 307/116; 379/111; 361/752
See application file for complete search history.

(56) References Cited

U.S. PATENT DOCUMENTS 3,833,779 A * 9/1974 Leone ......................... 200/33 R
2004/0160129 A1* 8/2004 Dahlberg ...................... 307/116
2005/0094786 A1* 5/2005 Ossa ............................. 379/111

* cited by examiner

*Primary Examiner* — Dhirubhai R Patel
(74) *Attorney, Agent, or Firm* — Kyle A. Fletcher, Esq.

(57) ABSTRACT

The programmable electrical outlet and keyed lock box for connection therewith is designed to program the output of electricity through an electrical outlet while simultaneously securing a male prong of an electronic appliance inside of the keyed lock box. The programmable electrical outlet includes a display and a plurality of buttons to program the electrical outlet, and an electrical cord with GFCI circuitry integrated into the male plug. The keyed lock box is specifically designed to contain and lock inside the programmable electrical outlet and the male plug of the electronic appliance. The keyed lock box includes a window to enable viewing of the display of the programmable electrical outlet. The keyed lock box also includes a snooze button extension that aligns with a snooze button located on the programmable electrical outlet.

9 Claims, 6 Drawing Sheets

PROGRAMMABLE ELECTRICAL OUTLET AND KEYED LOCK BOX FOR CONNECTION THEREWITH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical outlets and extension cords, more specifically, a programmable electrical outlet that works in conjunction with a keyed lock box to secure an electrical cord thereto.

Electrical outlets and surge protectors are commonly used to power most electrically-driven appliances. However, the appliance may be something that needs to be restricted in use. That being said, there is a need for a programmable electrical outlet that works in conjunction with a keyed lock box such that the male end of an electrical cord of an electrical appliance is secured to the electrical outlet and locked inside of the lock box in order to limit the amount of time or certain times that the appliance is able to be turned on.

The device of the present application seeks to address this need by providing an electrical outlet that is programmable and which can be inserted inside of a keyed lock box in order to secure the male end of an electrical cord thereto.

B. Discussion of the Prior Art

As will be discussed immediately below, no prior art discloses a programmable electrical outlet that controls the frequency and period of time that electrical flow is provided to a male plug connected therewith; wherein the programmable electrical outlet includes a display and a plurality of buttons to program the electrical outlet; wherein a keyed lock box is included and into which the programmable electrical outlet and the male plug when connected shall be inserted and locked therein; wherein the keyed lock box includes a window to enable viewing of the display of the programmable electrical outlet; wherein the keyed lock box also includes a snooze button extension that aligns with a snooze button located on the programmable electrical outlet; wherein the keyed lock box includes notches at first and second distal ends; wherein a first notch enables the electrical cord of the male plug to exit the keyed lock box whereas a second notch enables an electrical cord of the programmable electrical outlet to exit; wherein the electrical cord of the programmable electrical outlet includes a programmable male plug with GFCI circuitry integrated therein, and which plugs into a standard wall outlet; wherein once the keyed lock box is locked closed with the programmable electrical outlet and male plug of connected electrical appliance, the male plug may not become disconnected and removed until the keyed lock box is opened.

The Cohen Patent (U.S. Pat. No. 7,362,213) discloses an apparatus for controlling usage of time for at least one electronic device. However, the apparatus does not include a programmable timer that controls the usage and frequency of electrical flow to an electrical outlet that connects with a male plug of an electrical appliance to be controlled therethrough, and which includes a keyed lock box that houses the timer and electrical outlet and male plug therein.

The Lindsay Patent Application Publication (U.S. Pub. No. 2006/0030955) discloses a method and apparatus for controlling power through a power cord including a power control console that may be programmed to restrict the flow of power through the power cord for only a specific duration or range of times. However, the apparatus does not include a keyed lock box.

The Palfi Patent Application Publication (U.S. Pub. No. 2008/0079536) discloses a usage time control device that disables a flow of output signals from a game console. However, the device does not include the use of a keyed lock box to work in conjunction with a programmable electrical outlet.

The McJunkin Patent (U.S. Pat. No. 5,051,837) discloses a home entertainment equipment control apparatus for limiting user access and limiting operation time that includes a housing having a hinged and key lock door. However, the housing does not accommodate or align a display of a programmable electrical outlet therein.

The Sweetser Patent (U.S. Pat. No. 5,168,372) discloses a video viewing control system that permits the parent to enter a viewing "allowance" (time) for each child and which disables viewing of a television by disrupting the television RF signal input. However, the system does not control the electrical power to the TV by locking the male end of the electrical cord inside of a keyed box that also connects to and contains the programmable electrical outlet therein.

The Beetner Patent (U.S. Pat. No. 4,484,220) discloses a locked monitor box for restricting the operating time of an electronic apparatus, such as a television set. However, the locked monitor box does not configure a programmable electrical outlet and display underneath and adjacent with a window, nor enable notches at distal ends to accommodate a programmable power cord and power cord of an electronic appliance to exit there from.

The Pecore Patent Application Publication (U.S. Pub. No. 2006/0176643) discloses an apparatus that integrates a time control into a detachable power cord. However, the apparatus does not include a keyed lock box specifically configured for use with a specifically designed programmable electrical outlet.

The Johnson Patent (U.S. Pat. No. 5,795,229) discloses a video game power controller that selectively supplies power to multiple different video-game systems and includes a built-in master switch, surge protection, an EMI filter, and a parental lockout switch. Again, the controller does not work in conjunction with a keyed lock box to lock a male prong inside and in connection with a programmable electrical outlet.

The Berger Patent (U.S. Pat. No. 5,283,475) discloses a lockable control box for a television having a timer. However, the lockable control box is specifically designed for use with a television, and does not enable viewing of a display located on a specifically adapted programmable electrical outlet.

The Rothstein Patent (U.S. Pat. No. 6,777,828) discloses a management apparatus for allowing a parent to limit the amount of time a specific user is allowed access to an electronic device. However, the apparatus does not enable viewing of a display located inside of a keyed lock box.

While the above-described devices fulfill their respective and particular objects and requirements, they do not describe a programmable electrical outlet that controls the frequency and period of time that electrical flow is provided to a male plug connected therewith; wherein the programmable electrical outlet includes a display and a plurality of buttons to program the electrical outlet; wherein a keyed lock box is included and into which the programmable electrical outlet and the male plug when connected shall be inserted and locked therein; wherein the keyed lock box includes a window to enable viewing of the display of the programmable electrical outlet; wherein the keyed lock box also includes a snooze button extension that aligns with a snooze button located on the programmable electrical outlet; wherein the keyed lock box includes notches at first and second distal ends; wherein a first notch enables the electrical cord of the male plug to exit the keyed lock box whereas a second notch enables an electrical cord of the programmable electrical outlet to exit; wherein the electrical cord of the programmable electrical outlet includes a programmable male plug with GFCI circuitry integrated therein, and which plugs into a standard wall outlet; wherein once the keyed lock box is locked closed with the programmable electrical outlet and male plug of connected electrical appliance, the male plug may not become disconnected and removed until the keyed lock box is opened. In this regard, the programmable electrical outlet and keyed lock box for connection therewith departs from the conventional concepts and designs of the prior art.

SUMMARY OF THE INVENTION

The programmable electrical outlet and keyed lock box for connection therewith is designed to program the output of electricity through an electrical outlet while simultaneously securing a male prong of an electronic appliance inside of the keyed lock box. The programmable electrical outlet includes a display and a plurality of buttons to program the electrical outlet, and an electrical cord with GFCI circuitry integrated into the male plug. The keyed lock box is specifically designed to contain and lock inside the programmable electrical outlet and the male plug of the electronic appliance. The keyed lock box includes a window to enable viewing of the display of the programmable electrical outlet. The keyed lock box also includes a snooze button extension that aligns with a snooze button located on the programmable electrical outlet. The keyed lock box includes notches at first and second distal ends, which enables the electrical cords of the programmable electrical outlet as well as the electrical appliance to exit therefrom while restricting the male plug of the electrical appliance from removal from within the keyed lock box.

An object of the invention is to provide a keyed lock box that is specifically adapted for use with a programmable electrical outlet such that a male plug of an electrical appliance when connected to the programmable electrical outlet, and when secured inside of the keyed lock box, shall not be disconnected or otherwise removed from within said keyed lock box thereby restricting the time and frequency of electricity to the electrical appliance.

A further object of the invention is to provide a keyed lock box that includes a window and snooze button extension, which are specifically located to enable viewing of a display and depression of a snooze button on the programmable electrical outlet.

A further object of the invention is to provide a keyed lock box that includes notches at distal ends, which enables electrical cords of the electrical appliance and the programmable electrical outlet to exit therefrom while preventing the male plug of the electrical appliance from becoming disconnected or otherwise removed from within the keyed lock box when closed.

These together with additional objects, features and advantages of the programmable electrical outlet and keyed lock box for connection therewith will be readily apparent to those of ordinary skill in the art upon reading the following detailed description of presently preferred, but nonetheless illustrative, embodiments of the programmable electrical outlet and keyed lock box for connection therewith when taken in conjunction with the accompanying drawings.

In this respect, before explaining the current embodiments of the programmable electrical outlet and keyed lock box for connection therewith in detail, it is to be understood that the programmable electrical outlet and keyed lock box for connection therewith is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the programmable electrical outlet and keyed lock box for connection therewith.

It is therefore important that the claims be regarded as including such equivalent construction insofar as they do not depart from the spirit and scope of the programmable electrical outlet and keyed lock box for connection therewith. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-5. A programmable electrical outlet and keyed lock box for connection therewith 100 (hereinafter invention) includes a keyed lock box 101 further defined by a top member 102 and a bottom member 103, which are connected to one another via a hinge 104. The hinge 104 runs along a length 104A of the keyed lock box 101. The top member 102 and the bottom member 103 form the overall shape of the keyed lock box 101, which is a box further defined with a first distal end 105 and a second distal end 106. The first distal end 105 and the second distal end 106 each include a notch 107 having a diameter 108 that is greater than a cord thickness 131, but less than a plug width 132.

The bottom member 103 includes a keyed lock 109 that works in conjunction with a lock notch 110 integrated inside of the top member 102. The keyed lock 109 and lock notch 110 enable the keyed lock box 101 to lock itself in a closed position (see FIGS. 2 and 4). The keyed lock 109 also requires a key 111 to lock or unlock the keyed lock 109 thereby enabling the keyed lock box 101 to open or closed as is needed.

The top member 102 includes a window 112 and a snooze button extension 113 that are located at pre-defined locations, which enable alignment with a display 120 and snooze button 121 of a programmable electrical outlet 122. The programmable electrical outlet 122 includes an outlet housing 123 that has an overall volume less than an interior 140 of the keyed lock box 101. Moreover, the outlet housing 123 includes a top surface 124, which includes the display 120, the snooze button 121 thereon. The top surface 124 also includes a time button 125, a day button 126, a bypass button 127, a minute button 128A, an hour button 128B, and a set button 129.

The outlet housing 123 is further defined with first distal end 151 upon which a programmed outlet 152 is located. Moreover, the outlet housing 123 includes a second distal end 153 having a programmable electrical cord 154 extending therefrom. The programmed outlet 152 and the programmable electrical cord 154 are in wired communication with a microprocessor 165 (hereinafter CPU). Moreover, the programmed outlet 152 enables a male plug 133 to connect therewith while inside of the keyed lock box 101. The male plug 133 includes an electrical cord 134 that extends to an electrical appliance 135, which is being restricted access to electricity via the invention 100.

The programmable electrical cord 154 is of an undefined length, and includes a programmable male plug 155 at a distal end, which includes a GFCI circuitry 156 integrated therein. The programmable male plug 155 is designed to plug into a standard wall outlet 170, and provide electricity to the invention 100.

Figure 5:
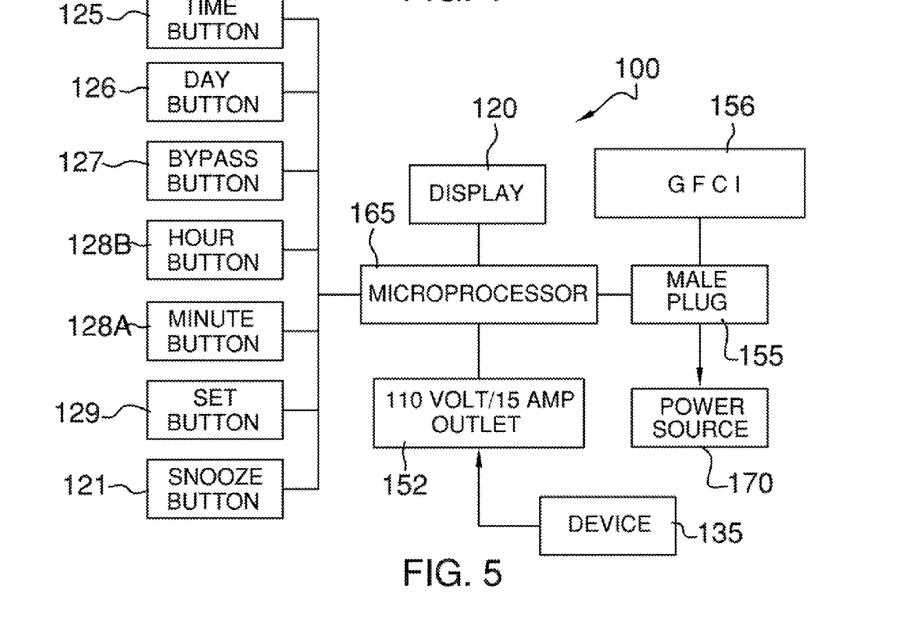
FIG. 5 illustrates a block diagram of the various components of the programmable electrical outlet.

The CPU 165 is in wired communication with the time button 125, the day button 126, the bypass button 127, the minute button 128A, the hour button 128B, the set button 129, and the snooze button 121. The CPU 165 controls the time and frequency, and duration with which electricity is supplied to the programmed outlet 152. Moreover, the CPU 156 is in wired communication with the programmed outlet 152. The CPU 156 is also wired to the display 120, which indicates the particulars of programming inputted via the several buttons (121, 125-129), and is visible from outside of the keyed lock box 101. An end user is able to set the time of day, specific days, amount of time allowed when electricity is provided, and other sequencing features into the CPU 156.

Figure 4:
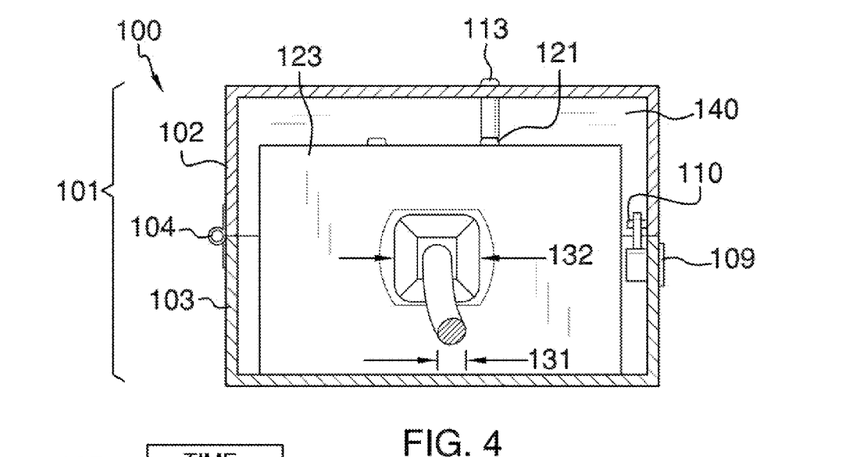
FIG. 4 illustrates a cross-sectional view of the programmable electrical outlet and keyed lock box for connection therewith along line 4-4 in FIG. 2.

Referring to FIG. 4, the snooze button extension 113 extends downwardly from the top member 102 of the keyed lock box 101. The snooze button extension 113 is designed to enable an end user to depress the snooze button 121 of the programmable electrical outlet 122 while locked inside of the keyed lock box 101. That being said, the CPU 156 enables an end user to operate the snooze button 121 a number of times in order to prolong access of electricity to the electrical appliance 135 that is plugged into the invention 100.

Figure 1:
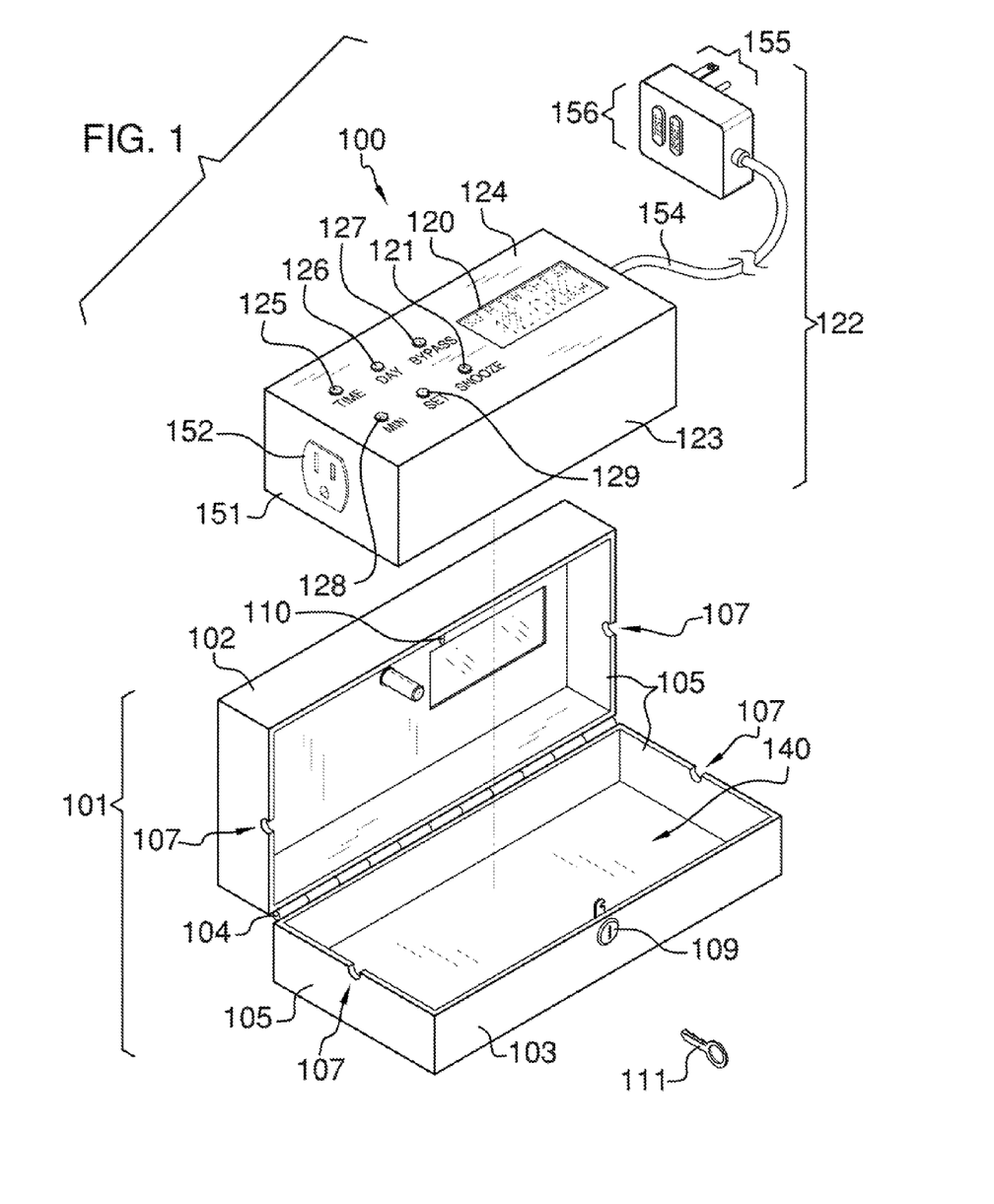
FIG. 1 illustrates a perspective view of the programmable electrical outlet aligned above the keyed lock box in an open state.
Figure 1A:
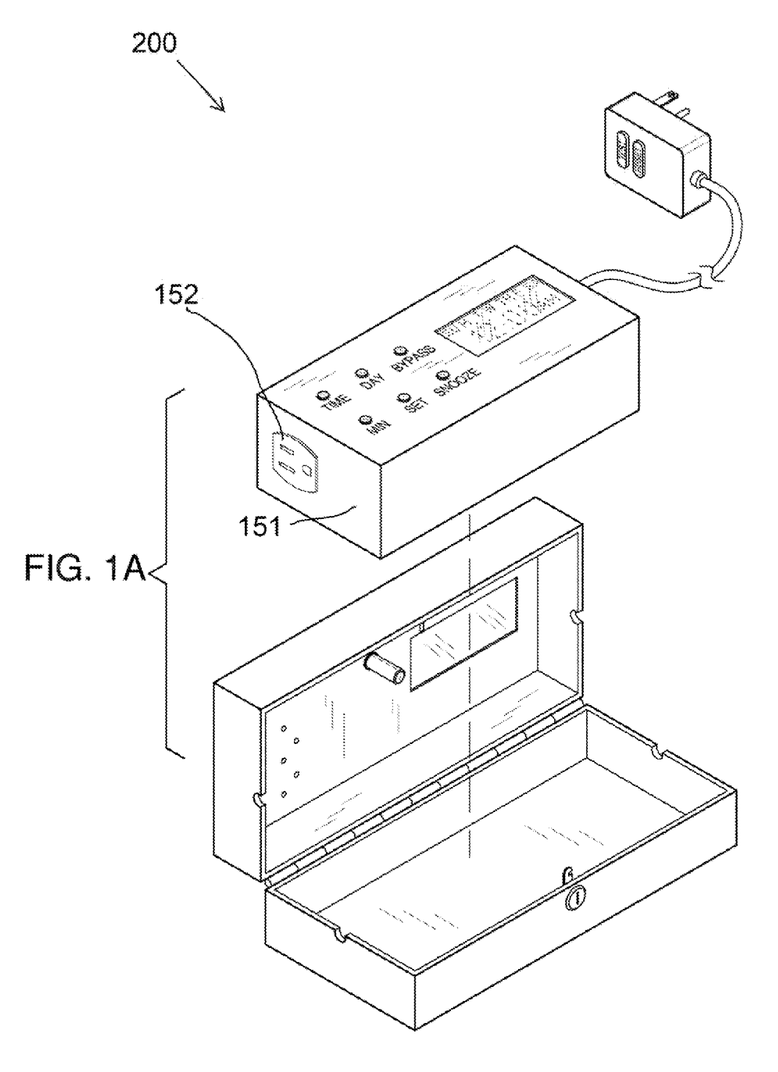
FIG. 1A illustrates an alternative embodiment that includes an electrical outlet rotatably engaged with respect to the outlet housing.
Figure 2:
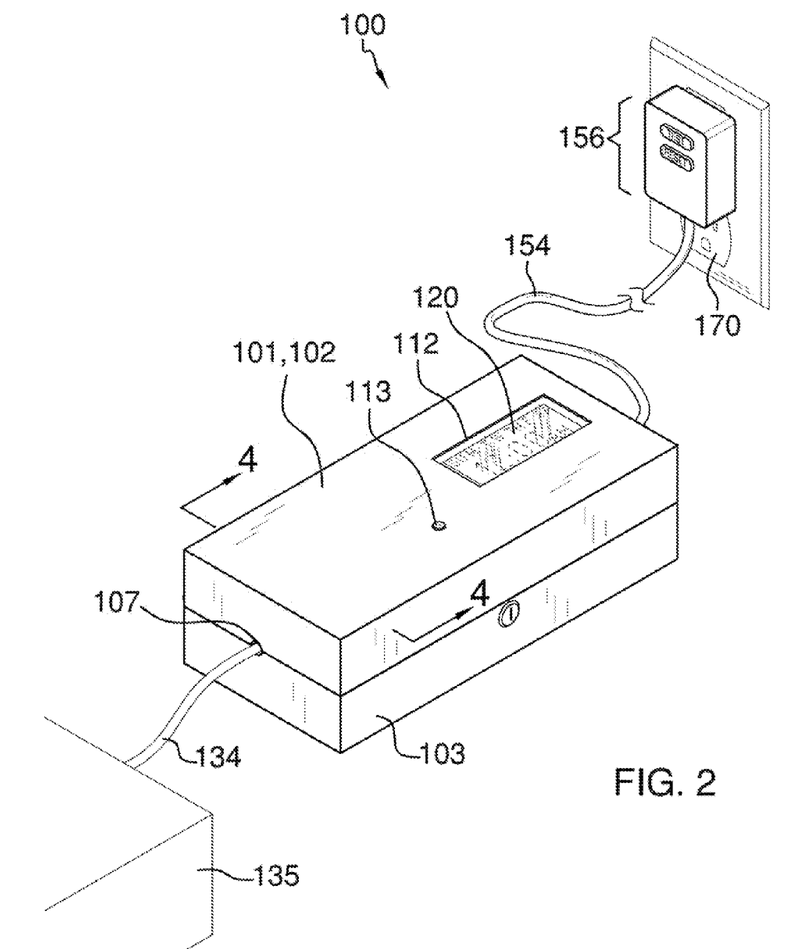
FIG. 2 illustrates a perspective view of the programmable electrical outlet with an electrical appliance connected thereto, and locked inside of the keyed lock box.
Figure 3:
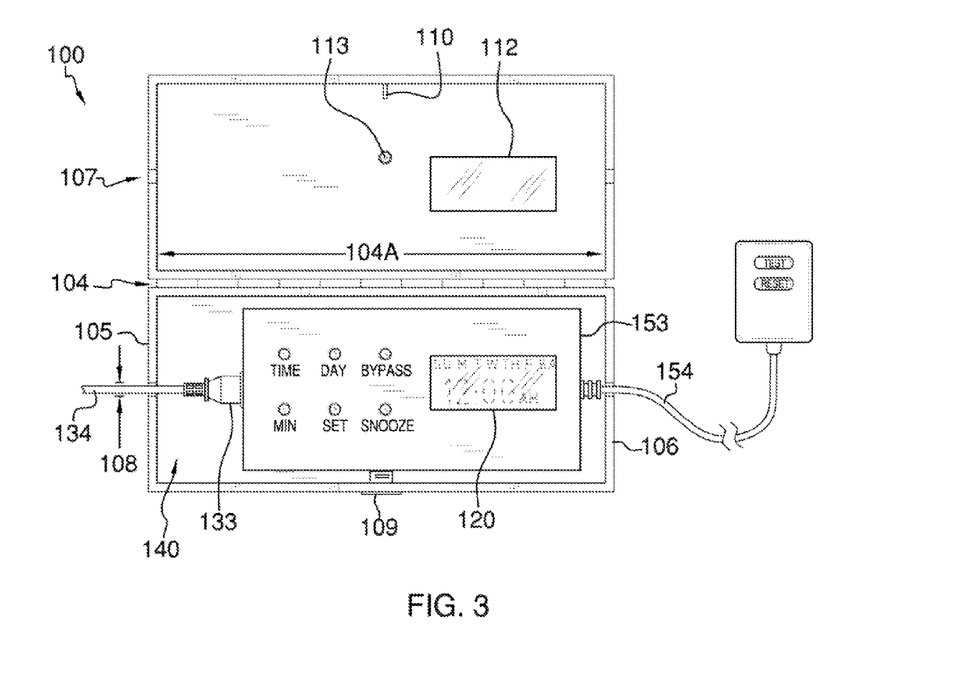
FIG. 3 illustrates a top view of the keyed lock box in an open state with the male plug of the electrical appliance connected to the programmable electrical outlet, and further detailing the configuration of components from inside of the keyed lock box.
Figure 3A:
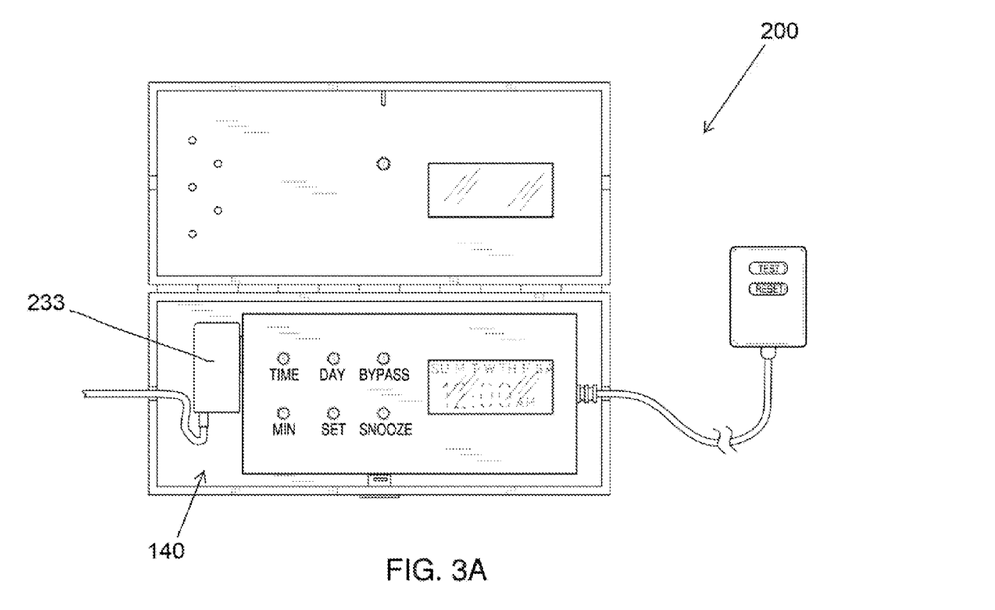
FIG. 3A illustrates a top view of the alternative embodiment in use with a male plug of an electrical appliance having a GFCI breaker or transformer integrated thereon, and which is able to fit inside of the keyed lock box.

Referring to FIGS. 1A and 3A, an alternative embodiment 200 is depicted, and is primarily included to depict the invention 100 in use with a male plug 233 that includes either a transformer or GFCI integrated therein, which requires additional space inside of the interior 140 of the keyed lock box 101. It shall be noted that the outlet housing 123 includes the programmed outlet 152 on the first distal end 151, but is rotated thereon in order to accommodate the male plug 233 therein.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A programmable electrical outlet and keyed lock box for connection therewith comprising: a keyed lock box with notches provided at distal ends; wherein the keyed lock box opens to enable insertion or removal of a programmable electrical outlet; wherein the programmable electrical outlet is configured to attach to a connected male plug of an electrical appliance; wherein the programmable electrical outlet is configured to limit access of electricity to the male plug of the electrical applicant, wherein one of the notches of the keyed lock box are configured to enable the connected male plug of the electrical appliance exit said keyed lock box, wherein the keyed lock box is further defined by a top member and a bottom member, which are connected to one another via a hinge; wherein the hinge runs along a length of the keyed lock box, wherein the top member and the bottom member form the overall shape of the keyed lock box, which has a box shape further defined with a first distal end and a second distal end; wherein the first distal end and the second distal end each include a notch having a diameter that is greater than a cord thickness, but less than a plug width, wherein the top member includes a window and a snooze button extension that are located at pre-defined locations, wherein the programmable electrical outlet includes an outlet housing with a display and snooze button which enable alignment with the display and the snooze button of the programmable electrical outlet when inserted inside of the keyed lock box.

2. The programmable electrical outlet and keyed lock box for connection therewith as described in claim 1 wherein the bottom member includes a keyed lock that works in conjunction with a lock notch integrated inside of the top member; wherein the keyed lock and lock notch enable the keyed lock box to lock itself in a closed position; wherein the keyed lock also requires a key to lock or unlock the keyed lock thereby enabling the keyed lock box to open or closed as is needed.

3. The programmable electrical outlet and keyed lock box for connection therewith as described in claim 1 wherein the programmable electrical outlet includes the outlet housing that has an overall volume less than an interior of the keyed lock box; wherein the outlet housing includes a top surface, which includes thereon the display, the snooze button, a time button, a day button, a bypass button, a minute button, an hour button, and a set button.

4. The programmable electrical outlet and keyed lock box for connection therewith as described in claim 3 wherein the outlet housing is further defined with first distal end upon which a programmed outlet is located; wherein the outlet housing includes a second distal end having a programmable electrical cord extending therefrom; wherein the programmed outlet and the programmable electrical cord are in wired communication with a microprocessor.

5. The programmable electrical outlet and keyed lock box for connection therewith as described in claim 4 wherein the programmed outlet enables the male plug of the electrical appliance to connect therewith while inside of the keyed lock box; wherein the male plug includes an electrical cord that extends through one of the notches of the keyed lock box, and to the electrical appliance, which is being restricted access to electricity via the programmed outlet.

6. The programmable electrical outlet and keyed lock box for connection therewith as described in claim 5 wherein the programmable electrical cord is of an undefined length, and includes a programmable male plug at a distal end, which includes a ground fault circuit interrupter integrated therein; wherein the programmable male plug is designed to plug into a standard wall outlet, and provide electricity to the programmable electrical outlet.

7. The programmable electrical outlet and keyed lock box for connection therewith as described in claim 6 wherein the microprocessor is in wired communication with the time button, the day button, the bypass button, the minute button, the set button, and the snooze button; wherein the microprocessor controls the time, frequency, and duration with which electricity is supplied to the programmed outlet; wherein the microprocessor is in wired communication with the programmed outlet, and the display.

8. The programmable electrical outlet and keyed lock box for connection therewith as described in claim 7 wherein the snooze button extension extends downwardly from the top member of the keyed lock box; wherein the snooze button extension enables depression of the snooze button of the programmable electrical outlet while locked inside of the keyed lock box.

9. A programmable electrical outlet and keyed lock box for connection therewith comprising: a keyed lock box with notches provided at distal ends; wherein the keyed lock box opens to enable insertion or removal of a programmable electrical outlet; wherein the programmable electrical outlet is configured to attach to a connected male plug of an electrical appliance; wherein the programmable electrical outlet is configured to limit access of electricity to the male plug of the electrical applicant, wherein one of the notches of the keyed lock box are configured to enable the connected male plug of the electrical appliance exit said keyed lock box; wherein the keyed lock box is further defined by a top member and a bottom member, which are connected to one another via a hinge; wherein the hinge runs along a length of the keyed lock box; wherein the top member and the bottom member form the overall shape of the keyed lock box, which has a box shape further defined with a first distal end and a second distal end; wherein the first distal end and the second distal end each include a notch having a diameter that is greater than a cord thickness, but less than a plug width; wherein the bottom member includes a keyed lock that works in conjunction with a lock notch integrated inside of the top member; wherein the keyed lock and lock notch enable the keyed lock box to lock itself in a closed position; wherein the keyed lock also requires a key to lock or unlock the keyed lock thereby enabling the keyed lock box to open or closed as is needed; wherein the top member includes a window and a snooze button extension that are located at pre-defined locations, which enable alignment with a display and snooze button of the programmable electrical outlet when inserted inside of the keyed lock box, wherein the programmable electrical outlet includes an outlet housing that has an overall volume less than an interior of the keyed lock box; wherein the outlet housing includes a to surface, which includes thereon the display, the snooze button, a time button, a day button, a bypass button, a minute button, an hour button, and a set button, wherein the outlet housing is further defined with first distal end upon which a programmed outlet is located; wherein the outlet housing includes a second distal end having a programmable electrical cord extending therefrom; wherein the programmed outlet and the programmable electrical cord are in wired communication with a microprocessor, wherein the programmed outlet enables the male plug of the electrical appliance to connect therewith while inside of the keyed lock box; wherein the male plug includes an electrical cord that extends through one of the notches of the keyed lock box, and to the electrical appliance, which is being restricted access to electricity via the programmed outlet, wherein the programmable electrical cord is of an undefined length, and includes a programmable male plug at a distal end, which includes a ground fault circuit interrupter integrated therein; wherein the programmable male plug is designed to plug into a standard wall outlet, and provide electricity to the programmable electrical outlet, wherein the microprocessor is in wired communication with the time button, the day button, the bypass button, the minute button, the set button, and the snooze button; wherein the microprocessor controls the time, frequency, and duration with which electricity is supplied to the programmed outlet; wherein the microprocessor is in wired communication with the programmed outlet, and the display, wherein the snooze button extension extends downwardly from the top member of the keyed lock box; wherein the snooze button extension enables depression of the snooze button of the programmable electrical outlet while locked inside of the keyed lock box.

\* \* \* \* \*